(12) United States Patent
Dike

(10) Patent No.: US 6,262,841 B1
(45) Date of Patent: Jul. 17, 2001

(54) APPARATUS FOR PROJECTING A REAL IMAGE IN SPACE

(76) Inventor: Bruce D. Dike, P.O. Box 52, South Kent, CT (US) 06776

( * ) Notice: Subject to any disclaimer, the term of this patent is extended or adjusted under 35 U.S.C. 154(b) by 0 days.

(21) Appl. No.: 09/198,176

(22) Filed: Nov. 23, 1998

Related U.S. Application Data

(60) Provisional application No. 60/066,416, filed on Nov. 24, 1997.

(51) Int. Cl.⁷ .................................................. G02B 5/30
(52) U.S. Cl. ....................... 359/483; 359/485; 359/487; 359/495; 359/497; 353/20
(58) Field of Search ............................... 353/20; 359/15, 359/483, 485, 487, 495, 497

(56) References Cited

U.S. PATENT DOCUMENTS

| | | | |
|---|---|---|---|
| 3,443,858 | * | 5/1969 | La Russa ............................... 350/157 |
| 3,610,729 | * | 10/1971 | Rogers .................................. 350/157 |
| 3,785,715 | | 1/1974 | Mecklenborg . |
| 3,940,203 | * | 2/1976 | La Russa ............................... 350/3.5 |
| 4,007,979 | * | 2/1977 | Coblitz .................................. 350/156 |
| 4,093,347 | | 6/1978 | La Russa . |
| 4,163,542 | | 8/1979 | La Russa . |
| 4,383,740 | | 5/1983 | Bordovsky . |
| 4,653,875 | | 3/1987 | Hines . |
| 5,305,124 | | 4/1994 | Chern et al. . |
| 5,477,385 | | 12/1995 | Freeman . |
| 5,526,184 | | 6/1996 | Tokuhashi et al. . |
| 5,585,946 | | 12/1996 | Chern . |
| 5,629,806 | | 5/1997 | Fergason . |
| 5,654,828 | | 8/1997 | Togino et al. . |
| 5,673,151 | | 9/1997 | Rallison . |
| 5,715,023 | | 2/1998 | Hoppe . |
| 5,768,039 | | 6/1998 | Togino . |

* cited by examiner

*Primary Examiner*—Cassandra Spyrou
*Assistant Examiner*—Craig Curtis
(74) *Attorney, Agent, or Firm*—Steinberg & Raskin, P.C.

(57) ABSTRACT

An apparatus for projecting a real image in space (as opposed to a "real" image as opposed to a "virtual" or "infinity" image) and the elimination of unwanted "ghost" images achieved by providing a series of linear polarizers, quarter wave plate retarders, reflector/mirror elements, louvre film elements, and optical lenses in combination with a dual brightness enhancement film (DBEF) in alignment with a target to provide a real image at a predetermined location with respect to an observer.

14 Claims, 13 Drawing Sheets

APPARATUS FOR PROJECTING A REAL IMAGE IN SPACE

This claims the benefit of provisional application Ser. No. 60/066,416, filed on Nov. 24, 1997.

BACKGROUND OF THE INVENTION

1. Field of the Invention

The present invention relates to apparatus for image formation, and in particular to image forming apparatus for projecting real holographic images in space.

2. Description of the Prior Art

Systems capable of forming images from an illuminated object where one or a plurality of optically superimposed objects are projected into space find numerous and important applications in areas such as advertising and marketing, product exhibition, aircraft flight training and spacecraft simulation, as well as a host or other imaging applications.

One such system described in U.S. Pat. No. 3,940,203 issued Feb. 24, 1976, to LaRussa, which employs a reflection-type holographic analog of a spherical mirror and a birefringent array of optical elements. In this patent, the primary image source is linearly polarized and made incident upon the holographic mirror analog. The light from the primary image passing through the analog is provided a circular polarization by a first quarter wave plate. A fraction of this light is reflected by a beamsplitter where it is collimated and transmitted through the first quarter wave plate, beamsplitter, second quarter wave plate, and second polarizer. The result is then viewed by an observer.

This and other prior art relies upon the inclusion of two beam splitting surfaces within the system. Since the prior art's beam splitting surfaces are not preferential to any polarization state, a large portion of that light is indiscriminately lost within the system. Thus, the prior art requires either an extremely bright source image or, conversely, very dim ambient viewing conditions.

Other prior art relies upon an obliquely placed beamsplitter and concave reflector to produce floating images. Significant efficiency problems also exist as the source light is made incident upon beamsplitting surfaces. Additionally, the field of view characteristic of this art is constrained by the necessity to project the image beyond the obliquely place beamsplitter. Prior art of this configuration is also inherently large due to the basic geometry of the elements. Additionally, that prior art allows an observer to "look into" the device from certain vantage points and discern a "direct view" of the source of the real image.

BRIEF SUMMARY OF THE INVENTION

The object of projecting a bright real image in space (as opposed to a "virtual" or "infinity" image) and the elimination of unwanted "ghost" images is achieved by providing a series of linear polarizers, quarter wave plate retarders, reflector/mirror elements, louvre film elements and optical lenses in combination with a dual brightness enhancement film (hereinafter referred to as "DBEF") in alignment with a target to provide a real image at a predetermined location with respect to the observer.

An advantage of the present invention is the inclusion of the DBEF material. Unlike a standard beamsplitter, DBEF is a birefringent material, and as such, has the ability to reflect or transmit specific polarization states with high efficiency. Whereas previous systems' beamsplitting elements reflected or transmitted a polarized state of light with low efficiency and indiscriminately with respect to that polarization state, DBEF is not encumbered by this characteristic. Thus, a DBEF-based system has greater overall throughput and greater image brightness.

Another advantage of the use of DBEF and other birefringent materials is the prevention of a "direct view" of the source of a real image which is being projected, in conjunction with the attenuation of reflected, ambient light sources.

DETAILED DESCRIPTION OF THE INVENTION

Figure 1:
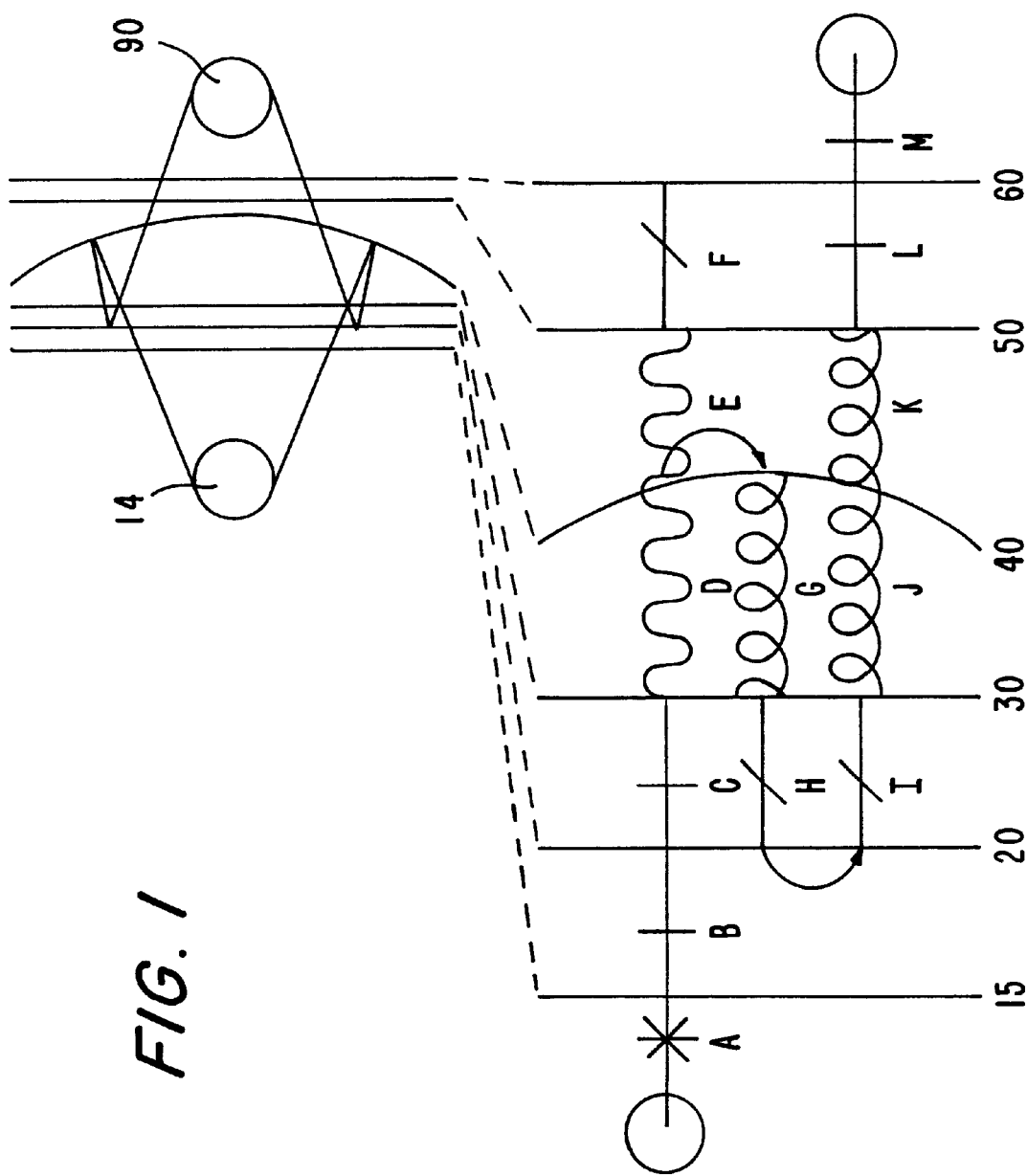
FIG. 1 is a schematic diagram of a reflector birefringent imaging apparatus according to a preferred embodiment of the present invention.

FIGS. 1–13 illustrate different embodiments of the present invention for projecting an image in space (a "real" image as opposed to a "virtual" or "infinity" image). Elements of each of the embodiments can be positioned or varied to provide a plurality of magnifications or de-magnifications of a source image, as well as a plurality of projection distances. The physics of the invention subscribe to the mathematics of the underlying optics of the system, (i.e., in the case of a spherical reflector-based device, the target distance, image distance and magnification all adhere to the mathematics of a basic, unencumbered spherical reflector system if the total optical path, including direction reversals, in the invention is taken into account.) The source or "target" can be a number of modalities including but not limited to: an illuminated object, CRT, plasma screen, LCD screen, LED panel or a front or rear projection screen (powered by LCD, CRT, light valve, or DMD projectors). In many cases, features such as the addition of louvre film to mask the original "target," or the tilting of one or more elements to eliminate unwanted "ghost" images produce a working variation of one of the illustrated embodiments. Accordingly, an exhaustive list of all possible combinations, permutations, and arrangements of the optical elements illustrated in the drawings is not depicted.

1. Reflector Birefringent Imaging Embodiment

Referring to FIG. 1, there is shown a target or source 14 that provides illumination A. Illumination A is randomly polarized in nature and is subsequently linearly polarized by linear polarizer 15 as it travels towards the viewer 80. This linearly polarized light B passes largely through a dual brightness enhancement film (DBEF) 20 whose axis is aligned in the transmissive orientation with respect to the linearly polarized light B (or, 90 degrees from the reflective orientation). The linearly polarized light that passes through the DBEF 20, light C, is circularly polarized in either right or left handedness by a quarter wave retarder 30. This circularly polarized light D (assumed right handed for this description) is then made incident upon a partially mirrored concave (spherical or aspherical) reflector 40. The concave element 40 serves to impart the convergence that ultimately forms the real image 90. The reflected portion G of the light has its circular polarization reversed to left handedness by such reflection and is converted into linearly polarized light H by the first quarter wave retarder 30. This linearly polarized light H is largely reflected by the DBEF 20 as the direction of polarization is opposite of the initially polarized light B. The portion of the light reflected by the DBEF, light I, is again left circularly polarized by the quarter wave retarder 30. This light J is partially reflected and partially transmitted by the partially mirrored concave reflector 40. The transmitted portion K is linearly polarized by a second quarter wave retarder 50. A second linear polarizer 60 is aligned such that the linearly polarized light L is transmitted, light M, to form the real image 90 apparent to the viewer.

The portion of light E that passes through the concave reflector 40 and then the quarter wave retarder 50 is linearly polarized in nature and of a orientation opposite to the surviving light L and M that passes completely through the apparatus to form the viewable image 90. As such, the linearly polarized light F is extinguished at the second linear polarizer 60.

2. Off-Axis Reflector Birefringent Imaging Embodiment

Figure 2:
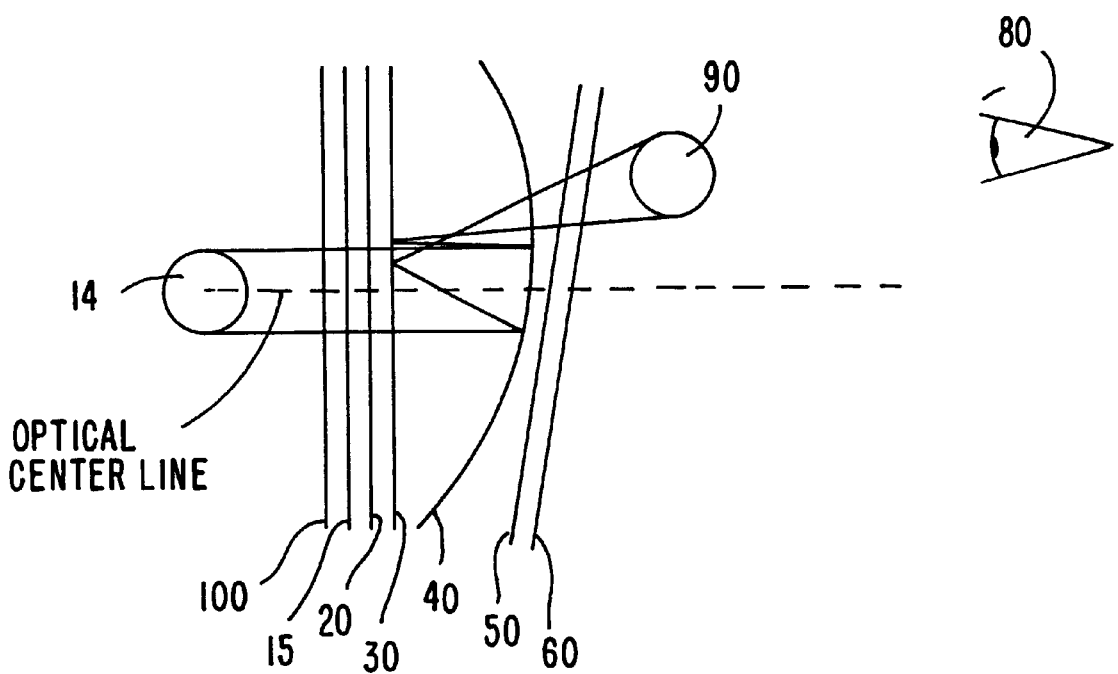
FIG. 2 is a schematic diagram of an off-axis reflector birefringent imaging apparatus according to a first alternative embodiment of the present invention, wherein elements are off-axis when compared to the preferred embodiment.

Referring to FIG. 2, an alternative embodiment of the present invention is shown. Birefringent materials generally function optimally over a relatively narrow band of the visible spectrum. As these devices are required to work over a broad band of visible light, inefficiencies exist that result in the generation of "ghost" images at a number of points along the optical axis. Additional "ghosts" are generated by the interface reflections of different materials, or of air/material, etc. The functional difference between the preferred embodiment and the first alternative embodiment is the elimination (or more accurately, misdirection outside the field of view) of several of the "ghost" images. This is accomplished by tilting a portion of the imaging apparatus such that the image does not exist along the central, or optical center line. In FIG. 2, the partially silvered concave mirror 40, the second quarter wave retarder 50, and the second linear polarizer 60 are tilted at an angle relative to the central axis or optical center line, such that the resulting real image 90 is formed above the optical center line upon which several of the ghost images are formed.

The louvre film 100, adjacent to the source 14, is an element having opaque louvres that limits the viewing angle, on one axis, over which the object is viewable. In this embodiment, the film restricts the viewability of the source object "ghost" from an observer's vantage while allowing maximum transmission along the horizontal optical path.

3. Simplified Reflector Birefringent Imaging Embodiment

Figure 3:
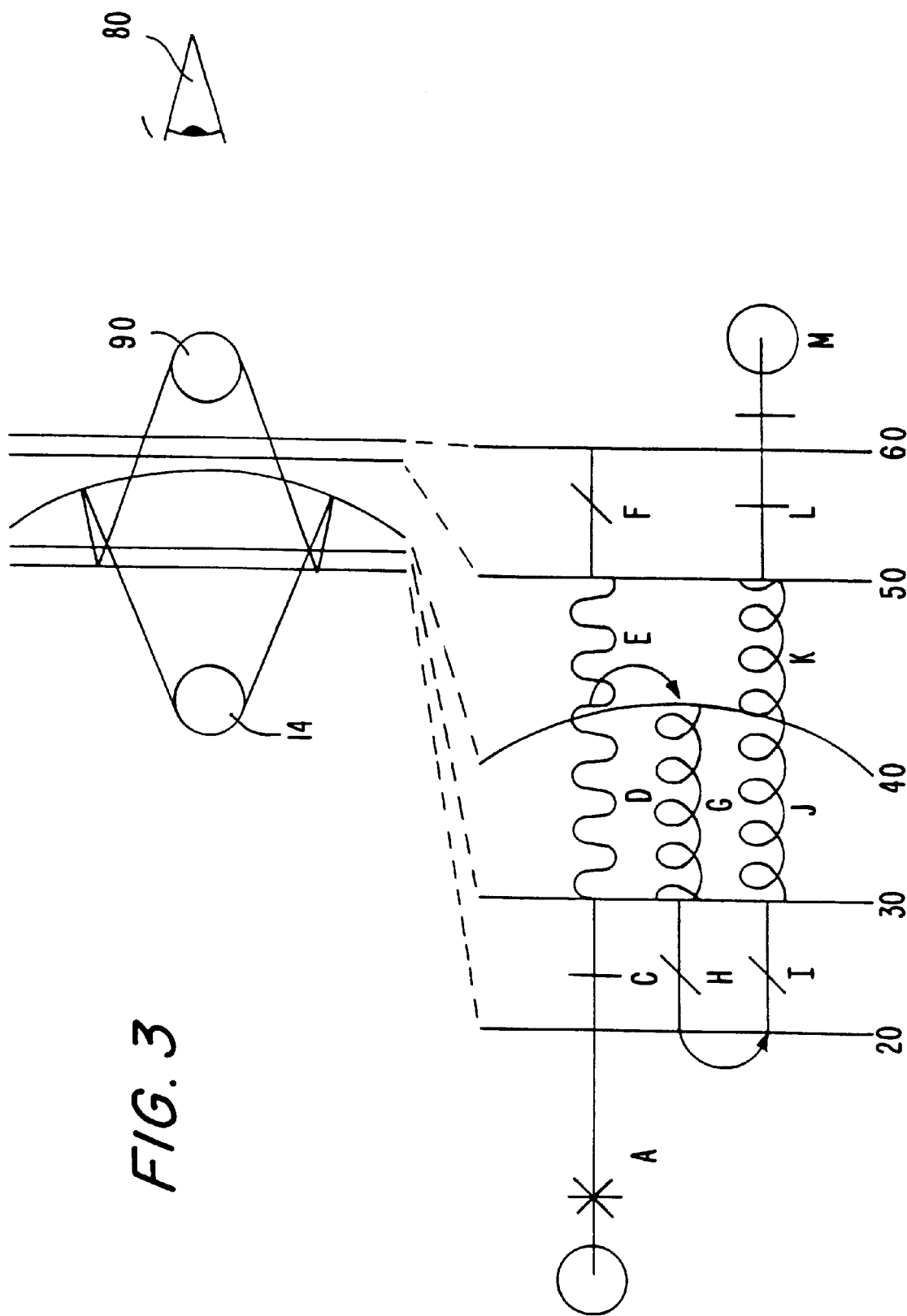
FIG. 3 is a schematic diagram of a simplified reflector birefringent imaging apparatus according to a second alternative embodiment of the present invention.

Referring to FIG. 3, the apparatus depicted here is identical to that described in FIG. 1, except that the linear polarizer 15 (see FIG. 1) has been eliminated. In this embodiment, the DBEF 20 functions as a polarizer in both the reflective and transmissive states so that the linear polarizer 15 can be eliminated However, this generally results in a higher intensity "ghost" image, since the DBEF is not as efficient a polarizer as is a linear polarizer.

This embodiment has application in situations where the illumination A is linearly polarized when generated by target source 14. LCD screens generate light which is linearly polarized. Thus, when an LCD screen is used as target source 14, the need for linear polarizer 15 is eliminated.

4. Lens Equivalent Birefringent Imaging Embodiment

Figure 4:
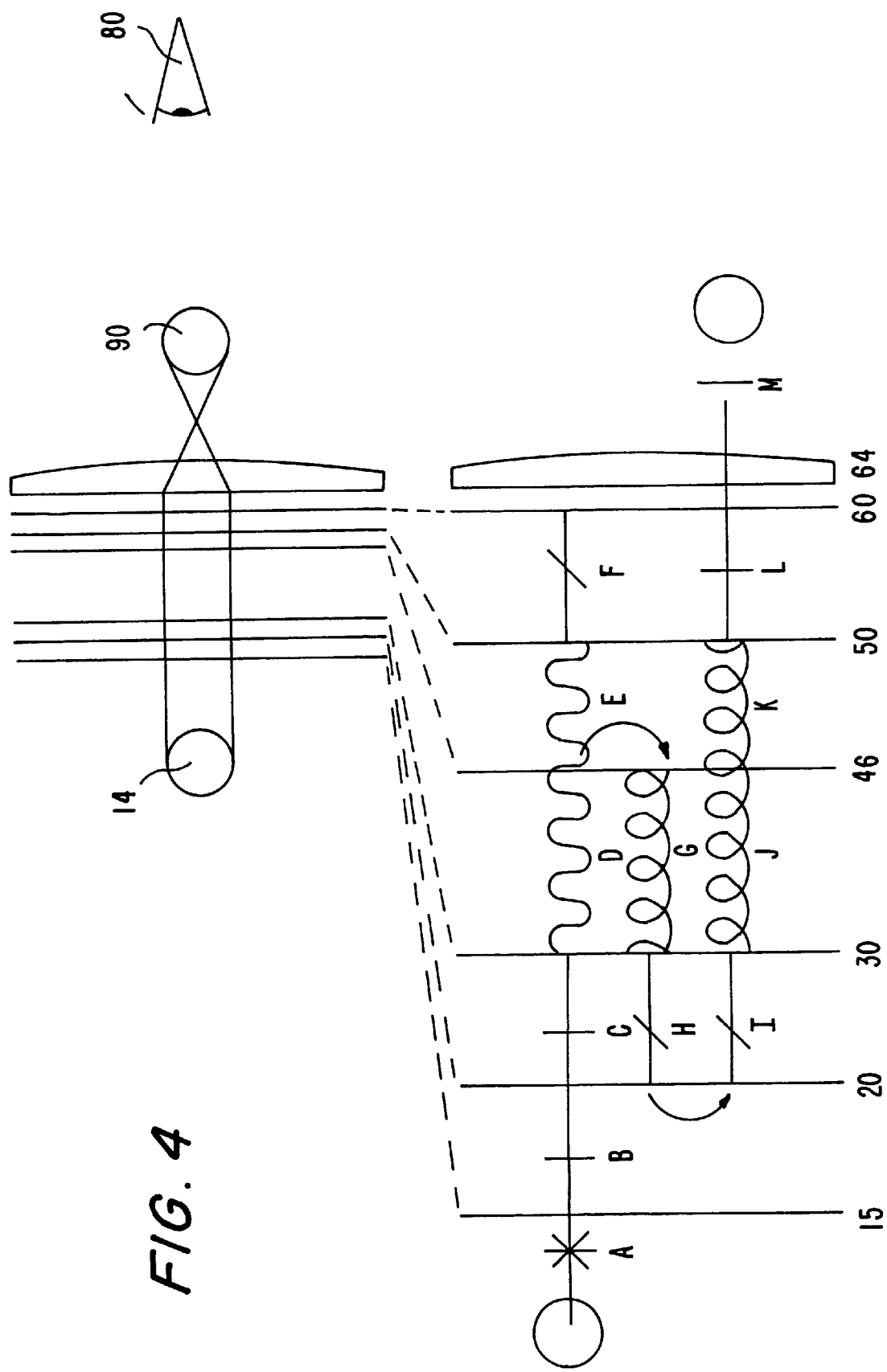
FIG. 4 is a schematic diagram of a lens equivalent birefringent imaging apparatus according to a third alternative embodiment of the present invention.

The embodiment depicted in FIG. 4 functions in an equivalent manner to the preferred and first and second alternative embodiments of FIGS. 1–3, but utilizes some different elements. The partially reflective concave mirror 40 is replaced by a planar beamsplitter 46 which has similar reflective and transmissive properties. The real, or floating image, 90, is formed by a lens 64 that comprises the last element of the apparatus. A Fresnel may be substituted for the lens 64. As such, the benefit of the imaging apparatus of the present invention relative to a simple lens system is the elimination of the majority of the optical path required for a target-lens-image system. The target-lens portion of the total optical path is significantly reduced as the distance between the DBEF 20 and the beamsplitter 46 is effectively traveled three times by the imaging light. The light beam path A–M of this third alternative embodiment is analogous to that of the preferred embodiment (see FIG. 1).

5. Off-Axis Lens Equivalent Birefringent Imaging Embodiment

Figure 5:
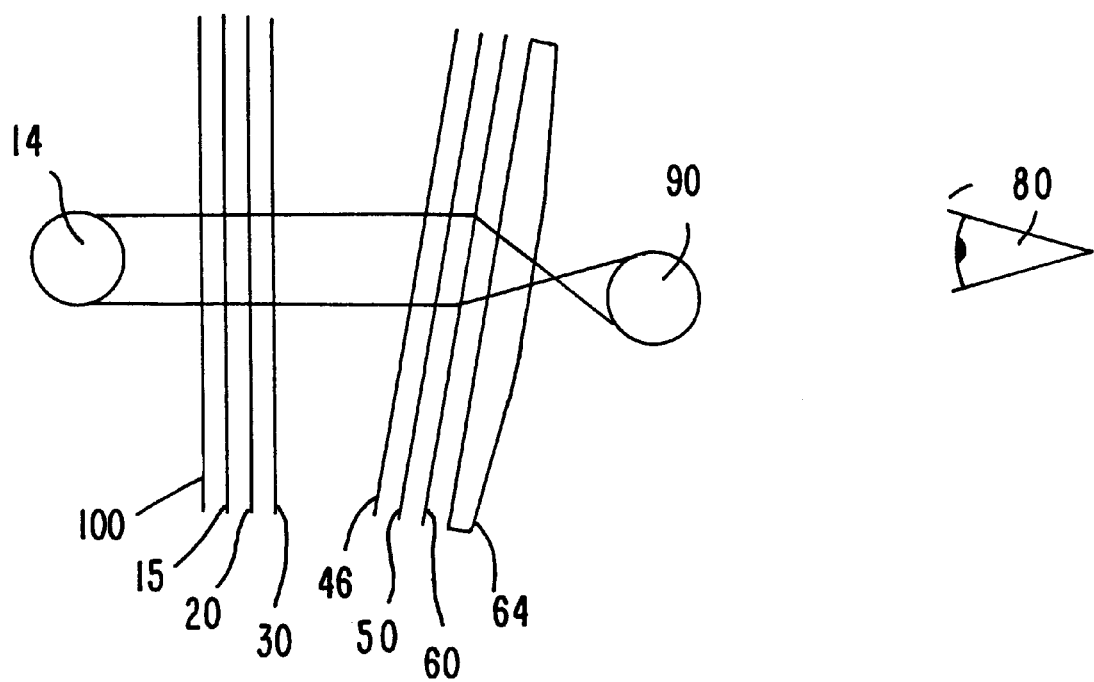
FIG. 5 is a schematic diagram of an off-axis lens equivalent birefringent imaging apparatus according to a fourth alternative embodiment of the present invention.

The embodiment illustrated in FIG. 5 is analogous to the first alternative embodiment of FIG. 2, but like the third alternative embodiment (see FIG. 4), employs lens equivalents to replace the partially reflective concave mirror. In this fourth alternative embodiment, louvre film 100 is included to restrict the viewability of source object "ghost" images from the viewer. Four elements, planar beamsplitter 46, quarter wave retarder 50 linear polarizer 60 and lens 64 (which may be either purely refractive or a Fresnel equivalent) are disposed at an angle to the central or optical center axis, and to the other optical elements which are disposed along the optical center axis.

6. Simplified Lens Equivalent Birefringent Imaging Embodiment

Figure 6:
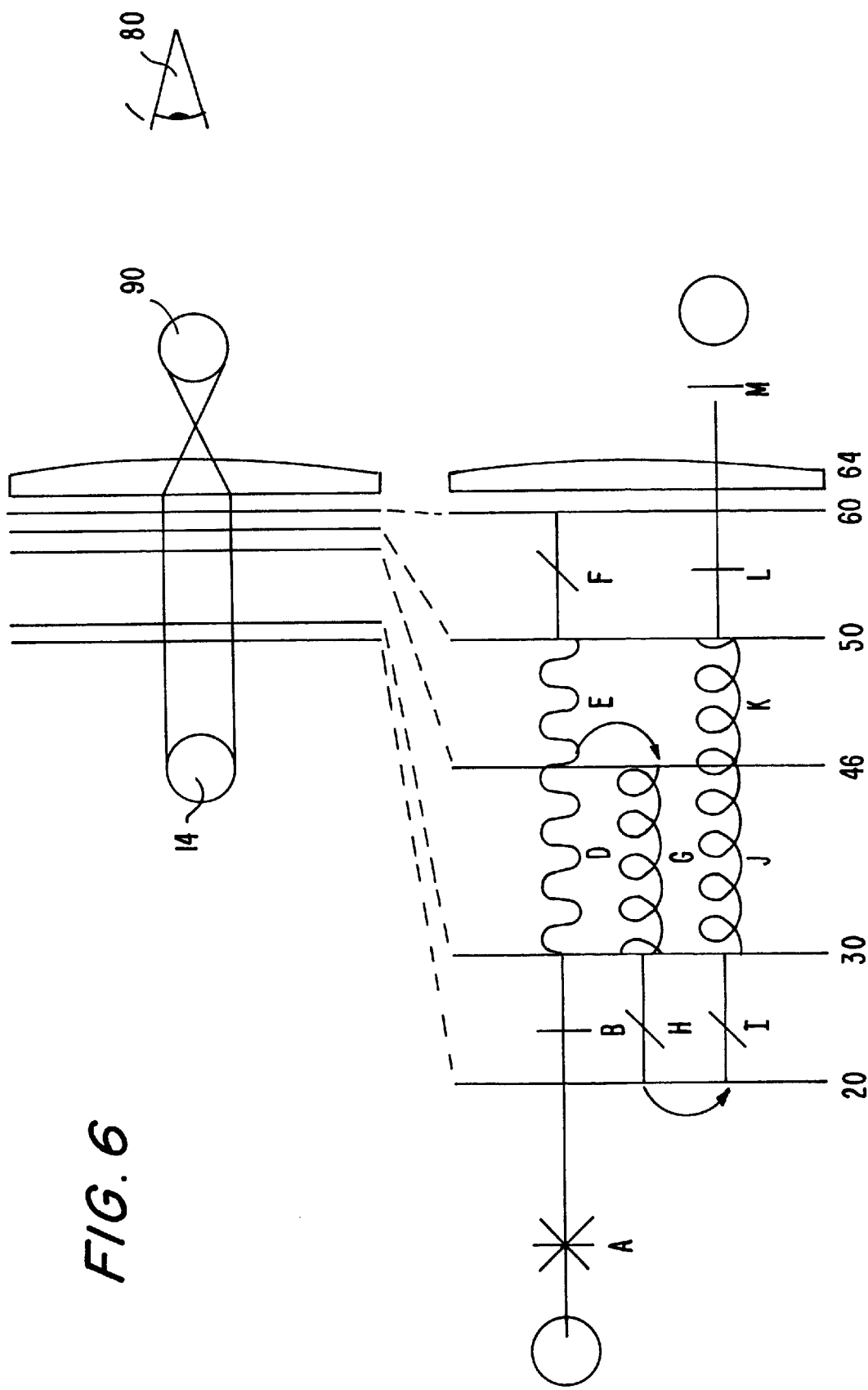
FIG. 6 is a schematic diagram of a simplified lens equivalent birefringent imaging apparatus according to a fifth alternative embodiment of the present invention.

Referring to FIG. 6 the apparatus depicted here is identical to that described in FIG. 4, except that the linear polarizer 15 (see FIG. 4) has been eliminated. This embodiment is also analogous to the second embodiment of FIG. 3. In this fifth alternative embodiment, the DBEF 20 functions as a polarizer in both the reflective and transmissive states so that the linear polarizer 15 can be eliminated However, this generally results in a higher intensity "ghost" image, since the DBEF is not as efficient a polarizer as is a linear polarizer.

Like the second alternative embodiment (see FIG. 3.), this embodiment has application in situations where the illumination A is linearly polarized when generated by target source 14. LCD screens generate light which is linearly polarized. Thus, when an LCD screen is used as target source 14, the need for linear polarizer 15 is eliminated.

7. Alternative Reflector Birefringent Imaging Embodiment

Figure 7:
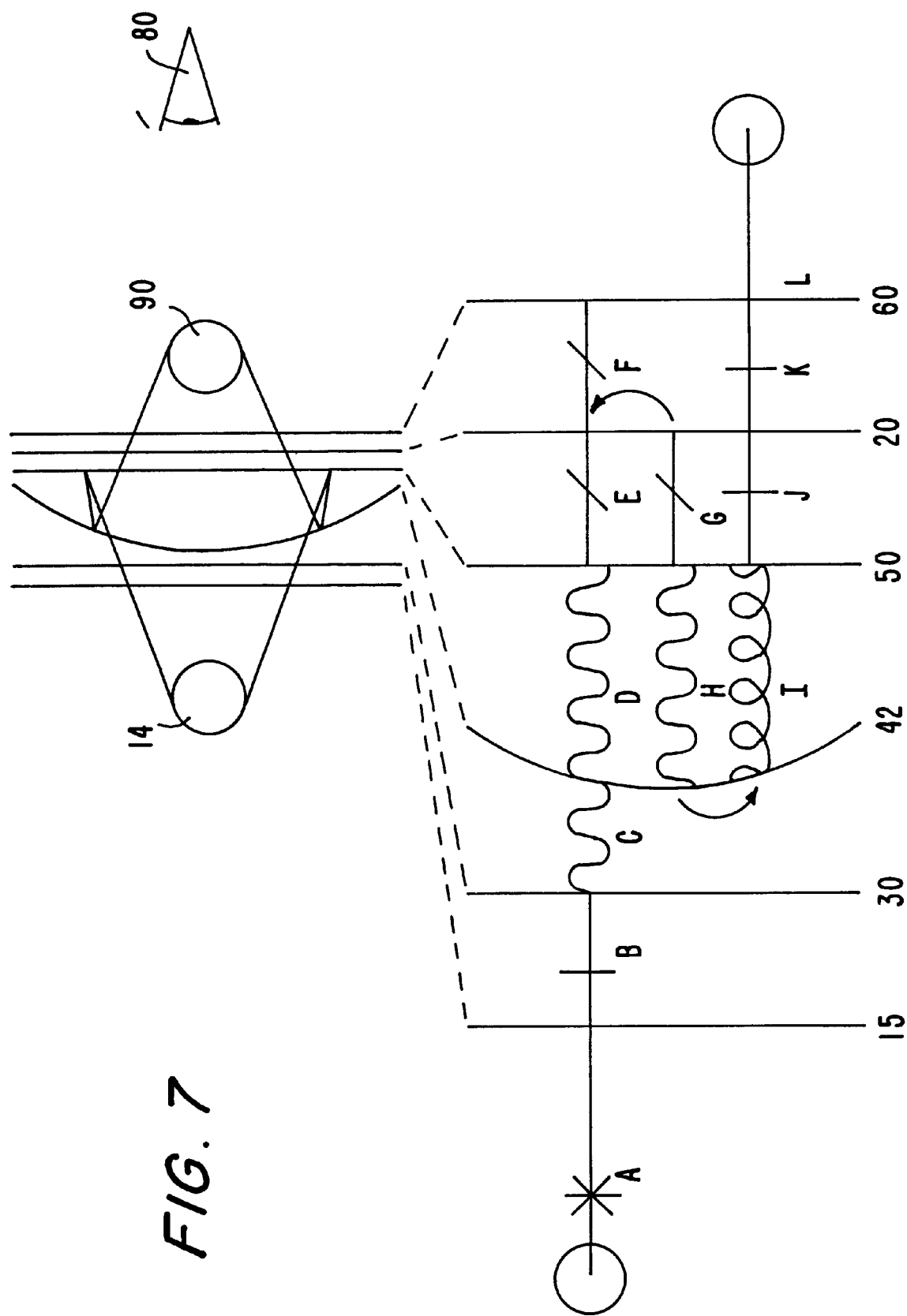
FIG. 7 is a schematic diagram of a reflector birefringent imaging apparatus according to a sixth alternative embodiment of the present invention, wherein the optical elements are transposed from those of the preferred embodiment.

A sixth alternative embodiment of the present invention, disclosed in FIG. 7, is similar to the preferred embodiment of FIG. 1, however, it transposes the optical elements of the preferred embodiment. Referring to FIG. 7, the randomly polarized target light A is linearly polarized by linear polarizer 15. The linearly polarized light B is converted to circular polarization (assumed right handed for this description) by first quarter wave retarder 30. The circularly polarized light C passes through a partially silvered concave reflector (spherical or aspherical) reflector 42 and through a second quarter wave retarder 50 where the light D is converted to linear polarization whose direction is either left or right as determined by the orientation of said linear polarizer 15. As with the preferred embodiment (see FIG. 1), the concave reflector 42 serves to impart the convergence that ultimately forms the real image 90. This linearly polarized light E is then largely reflected by DBEF 20 whose alignment is such that it is in its reflective mode with respect to the light E incident upon it. The linearly polarized and reflected light G passes through second quarter wave retarder 50 where it is converted to right handed circular polarized light H. This light is partially reflected by the partially mirrored concave reflector 42 and the handedness of the reflected light I is changed to the left by such reflection. The left circularly polarized light I is again converted to linearly polarized light J of a direction opposite the previously reflected light E and G. As its direction of polarization is opposite light E and G, the light passes through the DBEF 20 and through second linear polarizer 60 and to the exterior of the apparatus where it forms real image 90.

The portion of light F that passes or "leaks" through the DBEF 20 is still linearly polarized in nature and of a orientation opposite to the surviving light K and L that passes completely through the apparatus to form the viewable image 90. As such, the linearly polarized light F is extinguished at the second linear polarizer 60.

8. Alternative Off-Axis Reflector Birefringent Imaging Embodiment

Figure 8:
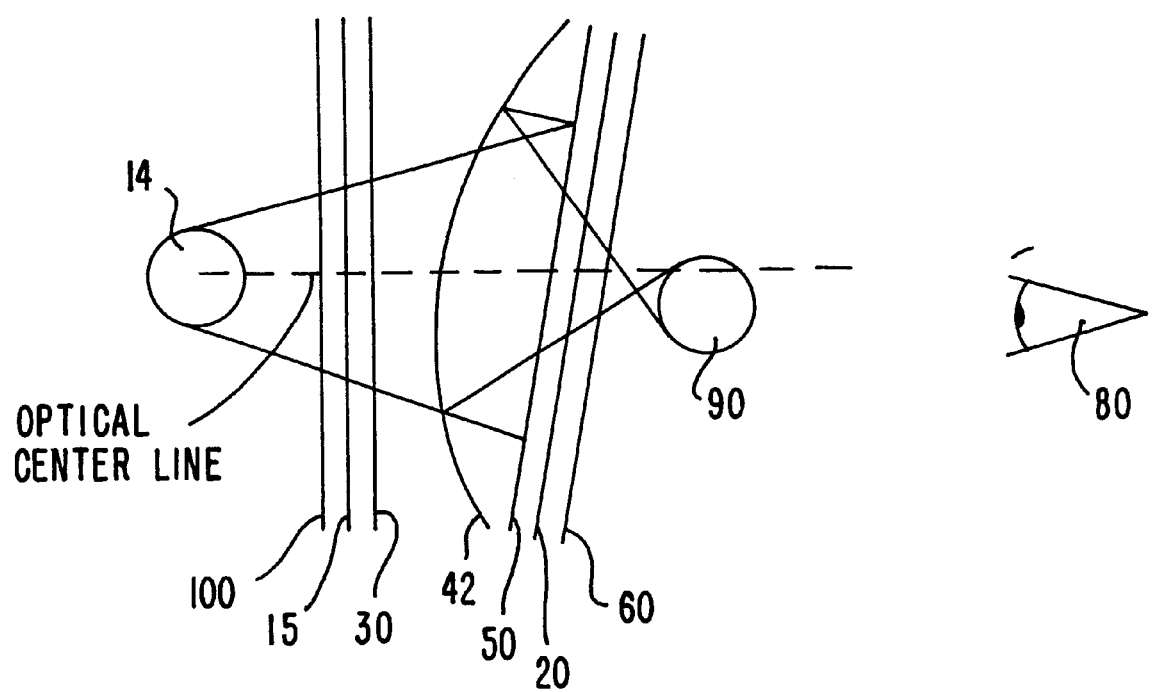
FIG. 8 is a schematic diagram of an off-axis reflector birefringent imaging apparatus according to a seventh alternative embodiment of the present invention, wherein the optical elements are transposed from those of the first alternative embodiment.

The embodiment illustrated in FIG. 8 is analogous to the first alternative embodiment (see FIG. 2) and the fourth alternative embodiment (see FIG. 3). It uses the basic configuration of the sixth alternative embodiment of FIG. 7. In this alternative embodiment, louvre film 100 is included to restrict the viewability of source object "ghost" image from the viewer by directing it away from the image axis. Four elements, partially silvered mirror 42, quarter wave retarder 50, DBEF 20, and linear polarizer 60 are disposed at an angle to the central or optical center axis, and to the other optical elements which are disposed along the optical center axis.

9. Alternative Reflector Birefringent Imaging Embodiment Adapted for Conventional Concave Mirror/Beamsplitter Real Image Devices Referring to FIG. 9, the eighth alternative embodiment is an enhancement of a concave mirror/beamsplitter device that provides for increased brightness in the image while significantly reducing background "ghost" images of light sources in the exterior environment. Also, this embodiment acts to eliminate the "direct view" of the source via the crossed polarizers 15 and 60.

Randomly polarized source light A is linearly polarized by a linear polarizer 15. This light is reflected by DBEF 20 which is oriented such that it imparts maximum reflection and minimum transmission of polarized light B. The reflected light C is circularly polarized by quarter wave retarder 30. The handedness of the circular polarization of light D is reversed by its reflection from a concave (spherical or aspherical) reflector 44 whose shape imparts the convergence that ultimately forms real image 90. The circularly polarized light E is converted to linearly polarized light F by the quarter wave retarder 30. Light F is of opposite handedness of the initially polarized light B and C and it is largely transmitted by the DBEF 20. Light G passes through a second linear polarizer where it forms the visible real image 90. The second linear polarizer 60 has no impact upon the emerging light and functions to reduce the ghosts of illuminated objects from the exterior of the apparatus (see FIG. 11, infra). Linear polarizer 60 is opposite in orientation to linear polarizer 15 and as such serves to limit the "direct view" of the target object from a high, close viewing position.

10. Reflector Birefringent Imaging Embodiment with a Background Image Source

Figure 9:
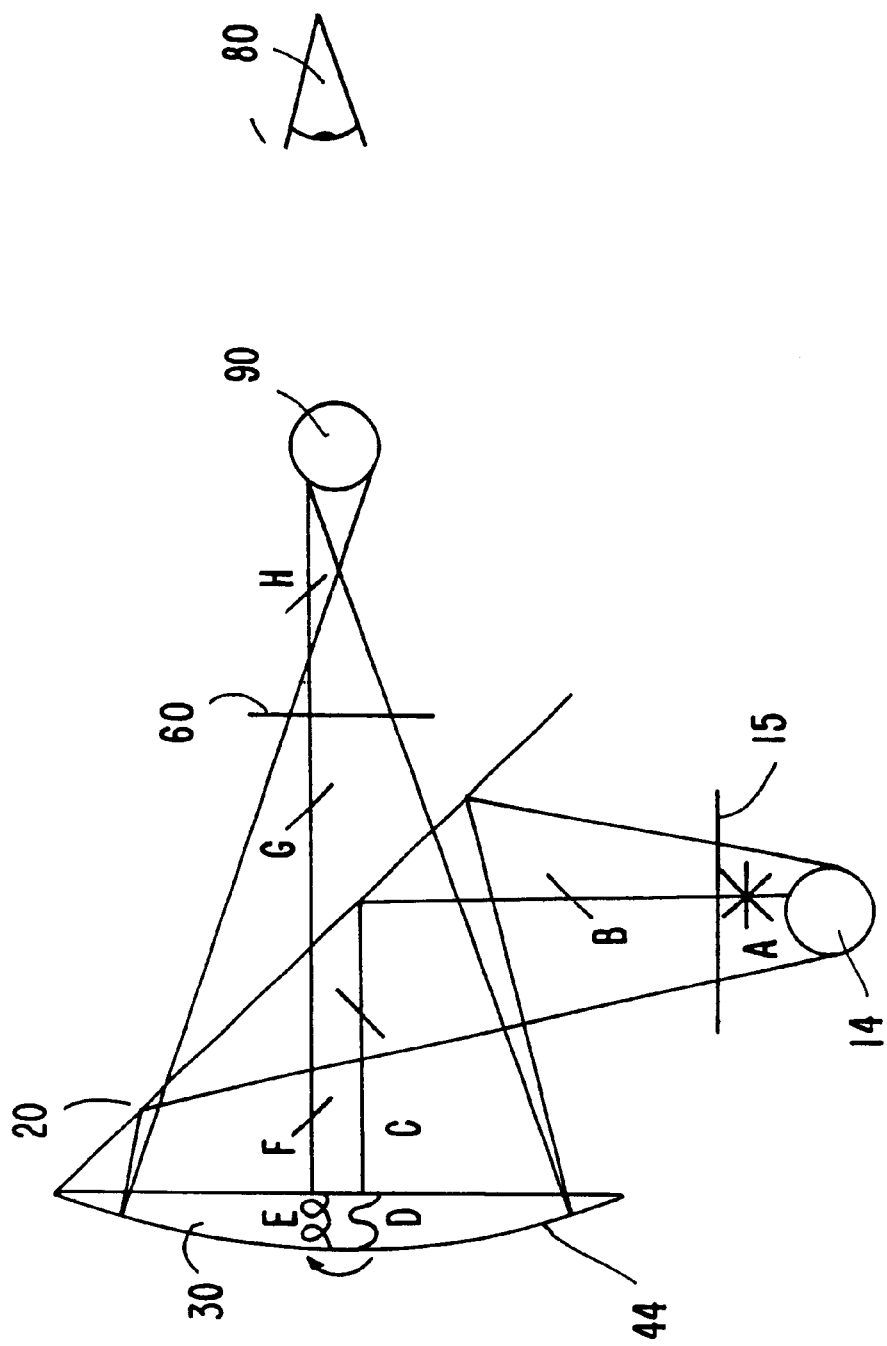
FIG. 9 is a schematic diagram of a reflector birefringent imaging apparatus according to an eighth alternative embodiment of the present invention, wherein the apparatus is adapted for conventional concave mirror/beamsplitter real image devices.
Figure 10:
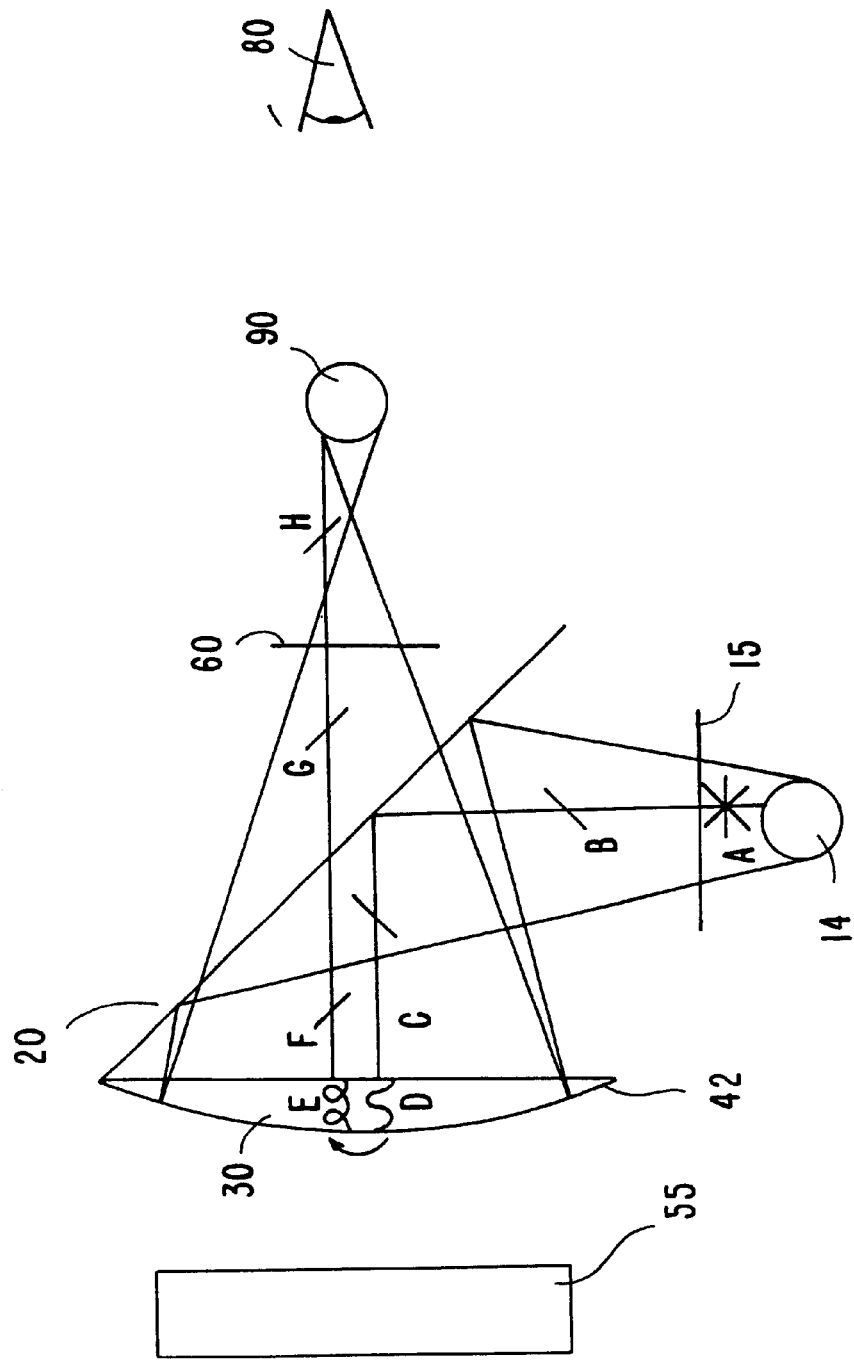
FIG. 10 is a schematic diagram of a reflector birefringent imaging apparatus with a background image source according to a ninth alternative embodiment of the present invention.

Referring to FIG. 10, the target light A that ultimately forms the real image 90 follows an identical path of the eighth alternative embodiment (see FIG. 9). This ninth alternative embodiment is optically identical to that of FIG. 9 with the exception that a partially silvered concave reflector 42 is substituted in lieu of concave reflector 44. A background image source 55 is placed behind the partially silvered concave reflector 42 and appears to the observer as a background that is centered on, and substantially behind, the real image 90 in front of the device. This "direct view"of the background image is possible due to the transmittive nature of linear polarizer 60, DBEF 20, quarter wave retarder 30, and the partially silvered concave reflector. The intensity of the of the background source 55 is significantly diminished by its passage through the four elements, but the relative darkness provides for high contrast and an adequately viewable image.

11. Alternative Reflector Birefringent Imaging Embodiment with a Background Image Source Referring to FIG. 11 and as in the ninth alternative embodiment, target light A that ultimately forms the real image 90 follows an identical path of the eight alternative embodiment (see FIGS. 9, 10). In this tenth alternative embodiment, a secondary, background image 58 is formed via the reflection of background source 55 upon DBEF 20. A reflected or virtual image is apparent centered and behind the real, projected image 90.

Figure 11:
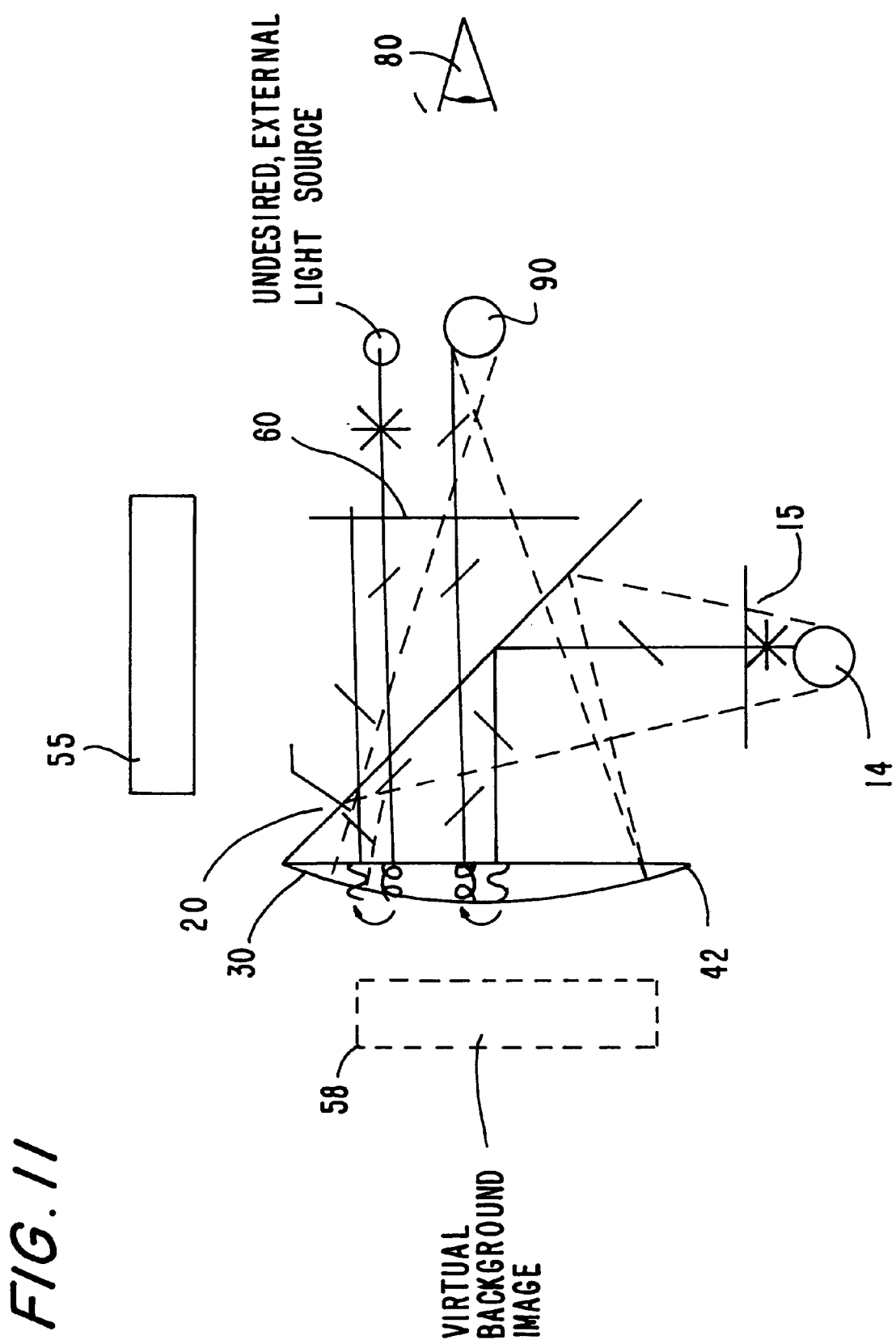
FIG. 11 is a schematic diagram of a reflector birefringent imaging apparatus with a background image source according to a tenth alternative embodiment of the present invention.

Referring to FIGS. 9–11, the second linear polarizer 60 depicted at the end of the optical path functions as follows. Undesired, external light directed into the apparatus is attenuated by being polarized in one direction, then reversed, and finally extinguished by the same polarizer that imparted the initial polarization state. Referring to FIG. 11, randomly polarized light I is linearly polarized by the linear polarizer 60. The polarized light J passes largely through the DBEF 20 and is subsequently circularly polarized by the quarter wave retarder 30. This light L has its direction of polarization reversed by reflection upon reflector 42. The linearly polarized light N that exits from the second passage through the quarter wave retarder 30 is largely reflected downwards by the DBEF 20 whose orientation is such that its reflective properties are maximized for the light N. An amount of light "leaks" through the DBEF 20 due to relatively poor birefringent performance at the large incident angle. This light is further attenuated by linear polarizer 60 whose orientation is now preferential to the absorption of the remaining light.

12. Wide Field Reflector Birefringent Imaging Embodiment

Figure 12:
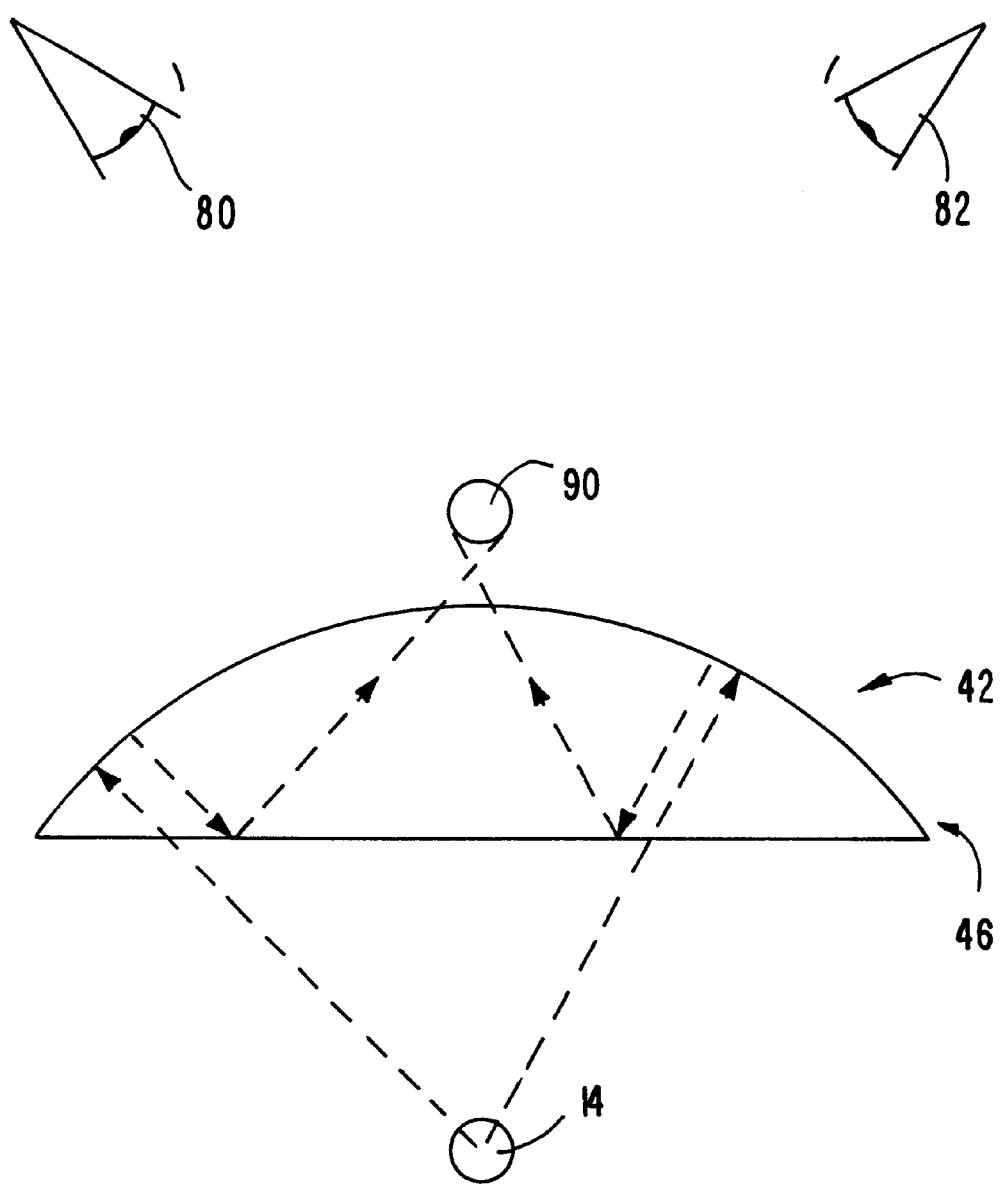
FIG. 12 is a schematic diagram of a wide field reflector birefringent imaging apparatus according to an eleventh alternative embodiment of the present invention.
Figure 13:
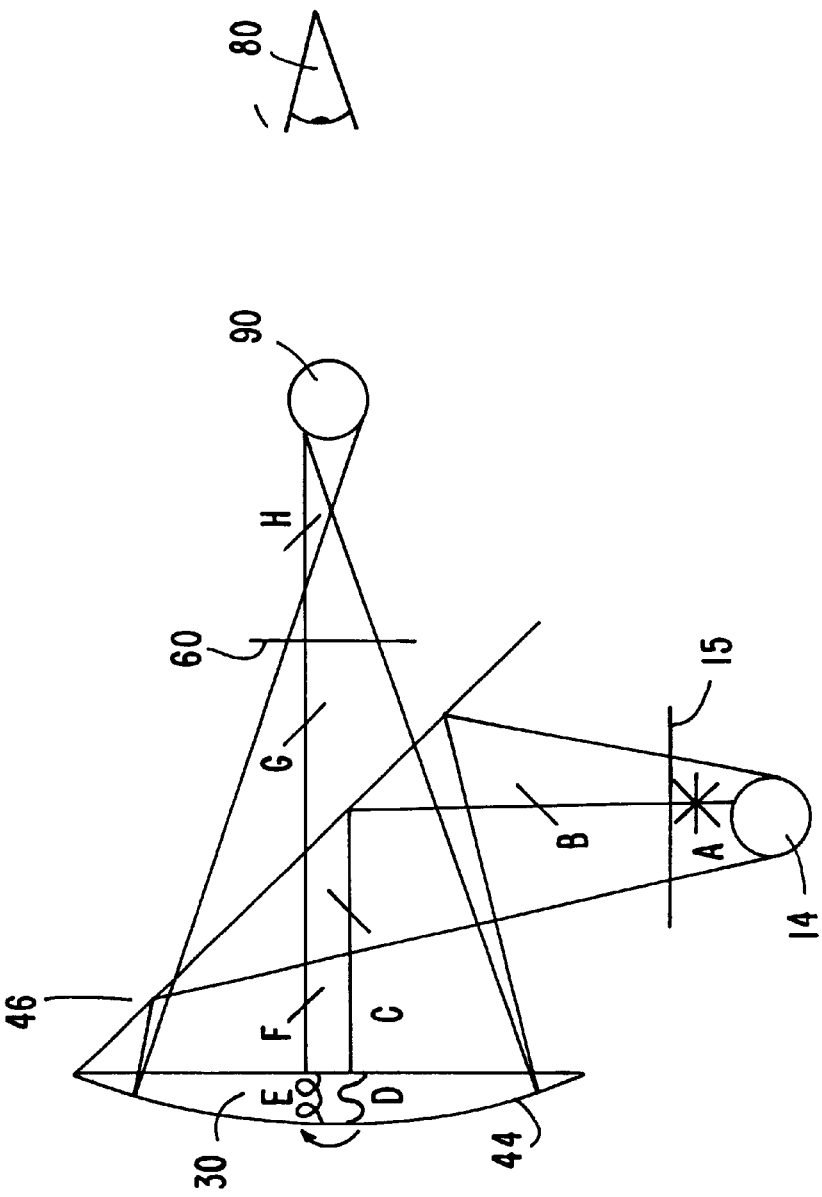
FIG. 13 is a schematic diagram of a reflector birefringent imaging apparatus according to a twelfth alternative embodiment of the present invention, where a DBEF element is replaced by a beamsplitter.

The eleventh embodiment of the present invention, illustrated in FIG. 12, produces a real image of a target source 14 that is viewable over a very wide angular field of view. The intended positioning is facing upwards such that multiple observers, such as 80, 82, placed peripherally around the apparatus can view the same image. An illuminated target 14 is positioned below both a planar, circular beamsplitter 46 and an inverted, concave (spherical reflector), partially mirrored reflector 42. The target light passes through the planar beamsplitter 46, reflects upon the partially mirrored concave reflector 42, and is directed through the reflector 42 to form the real image 90. As with the previous embodiments, many geometric alignments and birefringent masking solutions can serve to eliminate the many "ghost" images that are generated.

13. Reflector Birefringent Imaging Embodiment where a DBEF is Replaced by a Beamsplitter Referring to FIG. 13, a twelfth alternative embodiment is optically identical to that of FIG. 9 with the exception that a beamsplitter 46 is substituted in lieu of DBEF 20. Apparatus analogous to those of embodiments of FIGS. 10 and 11, whereby a background image is visible, either through a partially silvered concave reflector 44 or reflected upon the beamsplitter 46, are possible in this embodiment. The primary advantage of this type of embodiment is that the "direct view" of the source is impeded by the crossed polarizers 15 and 60. "Ghost" images of external light sources are attenuated as in the eight embodiment (see FIG. 9).

While preferred embodiments of the present invention have been described in detail, various modifications, alterations and changes may be made without departing from the spirit and scope of the present invention as defined in the following claims.

I claim:

1. An apparatus for projecting a real image in space comprising:
   a. at least one linear polarizer;
   b. a dual brightness enhancement film;
   c. a partially silvered concave reflector; and
   d. at least one quarter wave retarder.

2. The apparatus of claim 1 wherein:
   a. the dual brightness enhancement film is a cylindrical section dual brightness enhancement film, and
   b. the partially silvered concave reflector is a cylindrical section partially silvered concave reflector.

3. The apparatus of claim 1 wherein:
   a. a first linear polarizer is aligned parallel with the dual brightness enhancement film such that an axis intersecting both the first linear polarizer and the dual brightness enhancement film is perpendicular to both the first linear polarizer and the dual brightness enhancement film;
   b. a first quarter wave retarder is aligned parallel with the dual brightness enhancement film and opposite the first linear polarizer;
   c. the partially silvered concave reflector is aligned parallel with and concave toward the first quarter wave retarder, and is opposite the dual brightness film;
   d. a second quarter wave retarder is aligned parallel with the partially silvered concave reflector and opposite the first quarter wave retarder; and
   e. a second linear polarizer is aligned parallel with the second quarter wave retarder and opposite the partially silvered concave reflector.

4. The apparatus of claim 1 wherein:
   a. a first linear polarizer is aligned with a first quarter wave retarder;
   b. the partially silvered concave reflector is aligned with and convex toward the first quarter wave retarder, and is opposite the first linear polarizer;
   c. a second quarter wave retarder is aligned with the partially silvered concave reflector and opposite the first quarter wave retarder;
   d. the dual brightness enhancement film is aligned with the second quarter wave retarder and opposite the partially silvered concave reflector; and
   e. a second linear polarizer is aligned with the dual brightness enhancement film and opposite the second quarter waver retarder.

5. The apparatus of claim 1 wherein:
   a. the dual brightness enhancement film is aligned with a first quarter wave retarder;
   b. the partially silvered concave reflector is aligned with and concave toward the first quarter wave retarder, and is opposite the dual brightness enhancement film;
   c. a second quarter wave retarder is aligned with the partially silvered concave reflector and opposite the first quarter wave retarder; and
   d. a linear polarizer is aligned with the second quarter wave retarder and opposite the partially silvered concave reflector.

6. The apparatus of claim 1 further comprising a louvre film.

7. The apparatus of claim 6 wherein:
   a. the louvre film is aligned with a first linear polarizer;
   b. the dual brightness enhancement film is aligned with the first linear polarizer and opposite the louvre film;
   c. a first quarter wave retarder is aligned with the dual brightness enhancement film and opposite the first linear polarizer;
   d. the partially silvered concave reflector is not aligned with but is concave toward the first quarter wave retarder, and is opposite the dual brightness enhancement film;
   e. a second quarter wave retarder is aligned with the partially silvered concave reflector and opposite the first quarter wave retarder; and
   f. a second linear polarizer is aligned with the second quarter wave retarder and opposite the partially silvered concave reflector.

8. The apparatus of claim 6 comprising:
   a. the louvre film is aligned with a first linear polarizer;
   b. a first quarter wave retarder is aligned with the first linear polarizer and opposite the louvre film;
   c. the partially silvered concave reflector is not aligned with but is convex toward the first quarter wave retarder, and is opposite the first linear polarizer;

d. a second quarter wave retarder is aligned with the partially silvered concave reflector and opposite the first quarter wave retarder;

e. the dual brightness enhancement film is aligned with the second quarter wave retarder and opposite the partially silvered concave reflector; and f. a second linear polarizer is aligned with the dual brightness enhancement film and opposite the second quarter wave retarder.

9. The apparatus of claim 1 further comprising a background image source.

10. The apparatus of claim 9 wherein:

a. a first linear polarizer is oblique to the dual brightness enhancement film;

b. a quarter wave retarder is oblique to the dual brightness enhancement film and substantially perpendicular to the first linear polarizer;

c. the partially silvered concave reflector is aligned with and concave toward the quarter wave retarder, and is opposite the dual brightness enhancement film;

d. the background image source is aligned with the partially silvered concave reflector and opposite the quarter wave retarder; and e. a second linear polarizer is oblique to the dual brightness enhancement film, substantially perpendicular to the first linear polarizer and opposite the quarter wave retarder.

11. An apparatus for projecting a real image in space comprising:

a. at least one linear polarizer;

b. a dual brightness enhancement film;

c. a concave reflector; and d. at least one quarter wave retarder.

12. The apparatus of claim 11 wherein:

a. a first linear polarizer is oblique to the dual brightness enhancement film;

b. a quarter wave retarder is oblique to the dual brightness enhancement film and substantially perpendicular to the first linear polarizer;

c. the concave reflector is aligned with and concave toward the quarter wave retarder and opposite the dual brightness enhancement film; and d. a second linear polarizer is oblique to the dual brightness enhancement film, substantially perpendicular to the first linear polarizer, and opposite the quarter wave retarder.

13. The apparatus of claim 11 further comprising a background image source.

14. The apparatus of claim 13 wherein:

a. a first linear polarizer is oblique to the dual brightness enhancement film;

b. a background image source is oblique to the dual brightness enhancement film and opposite the first linear retarder;

c. a quarter wave retarder is oblique to the dual brightness enhancement film and substantially perpendicular to the first linear polarizer;

d. the concave mirror is aligned with and concave toward the quarter wave retarder, and is opposite the dual brightness enhancement film; and e. a second linear polarizer is oblique to the dual brightness enhancement film, substantially perpendicular to the first linear polarizer and opposite the quarter wave retarder.

* * * * *